(12) United States Patent
Tallini

(10) Patent No.: US 9,631,134 B2
(45) Date of Patent: *Apr. 25, 2017

(54) SUBTERRANEAN WELL TREATMENT SYSTEM

(71) Applicant: Lawrence O. Price, Meadville, PA (US)

(72) Inventor: Richard F. Tallini, Toledo, OH (US)

(73) Assignee: Lawrence O. Price, Meadville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/803,723

(22) Filed: Jul. 20, 2015

(65) Prior Publication Data

US 2015/0322332 A1 Nov. 12, 2015

Related U.S. Application Data

(63) Continuation of application No. 14/166,131, filed on Jan. 28, 2014, now Pat. No. 9,127,542.

(51) Int. Cl.
| | |
|---|---|
| *E21B 41/02* | (2006.01) |
| *C09K 8/584* | (2006.01) |
| *E21B 43/25* | (2006.01) |
| *E21B 43/12* | (2006.01) |

(Continued)

(52) U.S. Cl.
CPC .............. *C09K 8/584* (2013.01); *C09K 8/594* (2013.01); *E21B 43/12* (2013.01); *E21B 43/168* (2013.01); *E21B 43/25* (2013.01); *E21B 43/255* (2013.01)

(58) Field of Classification Search
CPC ..................................................... C09K 8/524
See application file for complete search history.

(56) References Cited

U.S. PATENT DOCUMENTS

| | | |
|---|---|---|
| 119,883 A | 10/1871 | Roberts |
| 119,884 A | 10/1871 | Roberts |
| 1,979,558 A | 11/1934 | King |

(Continued)

FOREIGN PATENT DOCUMENTS

| | | |
|---|---|---|
| CN | 1252426 A | 5/2000 |
| EP | 2638895 A2 | 9/2013 |
| GB | 1489046 A | 10/1977 |

*Primary Examiner* — Angela M DiTrani
*Assistant Examiner* — Avi Skaist
(74) *Attorney, Agent, or Firm* — Jonathan M. D'Silva; MMI Intellectual Property

(57) ABSTRACT

A process of treating a subterranean well comprising a plurality of flow channels and at least one of the flow channels is impaired. The treatment is used for alleviating the impairment. The process comprises a flow of gaseous carrier fluid supplied into the subterranean well. The gaseous carrier fluid pushes liquids out of the plurality of the flow channels. A liquid treatment agent is created. To create the liquid treatment agent, first, a surfactant solution is created and diluted with a solvent. The surfactant solution is created by compounding a plurality of non-ionic ethoxylated sorbitan fatty acid ester surfactants together until a proper hydrophilic-lipophilic balance is achieved. At some point, the liquid treatment agent is atomized. This atomized liquid treatment agent is blended with the gaseous carrier fluid, to create an atomized treatment fog. The atomized treatment fog is supplied into the subterranean well.

30 Claims, 1 Drawing Sheet

(51) Int. Cl.
    *C09K 8/594*     (2006.01)
    *E21B 43/16*     (2006.01)

(56) References Cited

U.S. PATENT DOCUMENTS

| | | | |
|---|---|---|---|
| 2,469,454 A | 5/1949 | Crumrine | |
| 3,096,819 A | 7/1963 | White, Jr. et al. | |
| 3,100,528 A | 8/1963 | Plummer et al. | |
| 3,358,763 A | 12/1967 | Petty et al. | |
| 3,364,994 A | 1/1968 | Sterrett | |
| 3,437,146 A | 4/1969 | Everhart et al. | |
| 3,933,204 A | 1/1976 | Knapp | |
| 4,298,066 A | 11/1981 | Colonna et al. | |
| 4,359,391 A | 11/1982 | Salathiel et al. | |
| 4,694,906 A | 9/1987 | Hutchins et al. | |
| 4,828,029 A * | 5/1989 | Irani | C09K 8/584 166/268 |
| 4,997,582 A | 3/1991 | Clark, Jr. et al. | |
| 5,099,930 A | 3/1992 | Enright et al. | |
| 5,560,737 A | 10/1996 | Schuring et al. | |
| 5,670,460 A * | 9/1997 | Neely | C09K 8/524 507/203 |
| 6,440,432 B1 | 8/2002 | Mukherjee et al. | |
| 6,972,274 B1 | 12/2005 | Slikta et al. | |
| 7,909,101 B2 | 3/2011 | Conrad | |
| 2001/0001991 A1 | 5/2001 | Patel et al. | |
| 2003/0079879 A1 | 5/2003 | Grainger et al. | |
| 2004/0116303 A1 | 6/2004 | Thaemlitz | |
| 2006/0166838 A1 | 7/2006 | Collins et al. | |
| 2007/0225174 A1 | 9/2007 | Berry et al. | |
| 2010/0130681 A1 | 5/2010 | Smith et al. | |
| 2011/0028358 A1 | 2/2011 | Welton et al. | |
| 2013/0126158 A1 | 5/2013 | Gupta et al. | |

\* cited by examiner

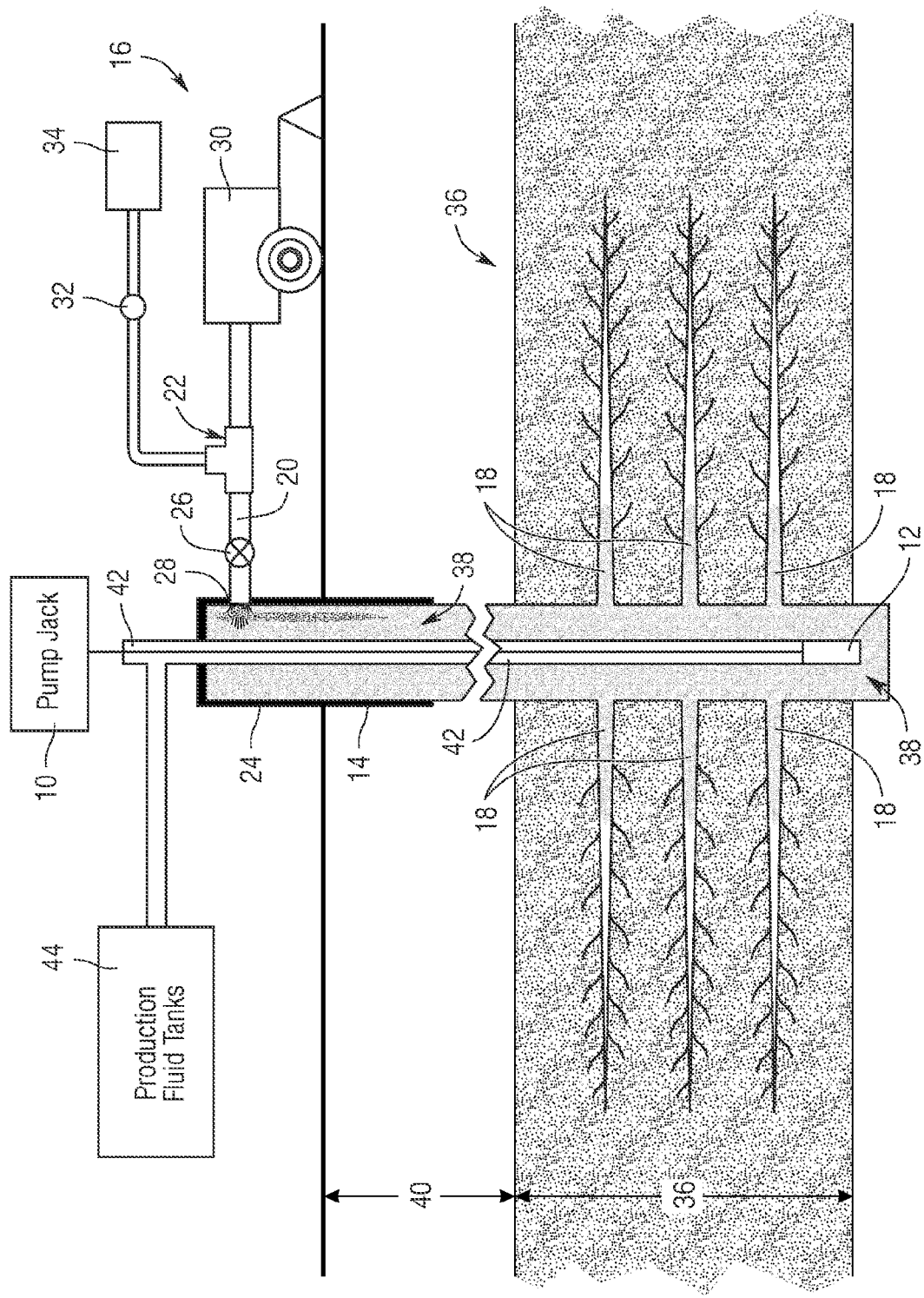

SUBTERRANEAN WELL TREATMENT SYSTEM

This application takes priority from U.S. application Ser. No. 14/166,131, filed Jan. 28, 2014, which is incorporated herein by reference.

BACKGROUND

Subterranean wells, in particular withdrawal wells, gas wells, and injection wells that are used to extract crude oil or other various types of hydrocarbon materials, known as valuable liquids. Typically, these subterranean wells comprise a network of natural or manmade flow channels through which liquids and hydrocarbon materials enter into, before being extracted from the subterranean well for commercial purposes. As production time passes, these flow channels tend to get impaired by clogs. When enough flow channels become impaired, extraction levels of valuable liquids from the subterranean well diminish and ultimately make the subterranean well uneconomical. There is a need to treat a subterranean well by substantially alleviating clogs in the flow channels, so extraction levels of valuable liquids can return to optimal levels and allow the subterranean well to be economical again.

SUMMARY

A process of treating a subterranean well comprising a plurality of flow channels and at least one of the flow channels has been impaired. The treatment is used for alleviating the impairment. The process comprises, a continuous flow of gaseous carrier fluid supplied into the subterranean well. Once in the subterranean well, the gaseous carrier fluid substantially pushes liquids out of the plurality of the flow channels. At some point, a liquid treatment agent is created. To create the liquid treatment agent, first, a surfactant solution is created and diluted with a solvent. The surfactant solution is created by compounding a plurality of non-ionic ethoxylated sorbitan fatty acid ester surfactants together until a proper hydrophilic-lipophilic balance is achieved. At some point, the liquid treatment agent is atomized. This atomized liquid treatment agent is blended with the gaseous carrier fluid, to create an atomized treatment fog. The atomized treatment fog is supplied into the subterranean well.

A portion of the liquids can be removed from the bottom of the subterranean well before supplying the continuous flow of gaseous carrier fluid into the subterranean well. The atomized treatment fog can be pressurized while in the subterranean well. The pressurized atomized treatment fog can then remain in the subterranean well for a duration of time. After the duration of time has ended, the subterranean well is depressurized such that the volume of the atomized treatment fog can escape. The duration of time can be between three and seven days, but it does not have to be. A volume of the liquid treatment agent can be placed into a treatment supply tank. The liquid treatment agent can then be provided from the treatment supply tank to an atomizing apparatus. The atomizing apparatus can blend the atomized liquid treatment agent with the gaseous carrier fluid.

A sorbitan fatty acid ester can also be compounded with the surfactant solution until a proper hydrophilic-lipophilic balance is achieved. The liquid treatment agent can be enhanced by adding inorganic acids, organic acids, clay stabilizers, bactericides, scale inhibitors, dissolved salts, emulsion breakers, water block breakers, or corrosion inhibitors. The subterranean well process can be implemented through a gaseous carrier fluid atomizing system. The surfactant solution can be diluted with the solvent in a ratio of 1 part surfactant solution to 20 parts solvent. The solvent can be one of water, toluene, condensate, acetone, oils, mutual solvents, or a combination thereof. The gaseous carrier fluid can be air, natural gas, oxygen, propane, nitrogen, helium, carbon dioxide, or a combination thereof. The solution ratio of the atomized treatment fog can be between 100 and 400. The atomized treatment fog can have the ability to energize and reduce the viscosity of the valuable liquids in the subterranean well. The atomized treatment fog can be supplied into the subterranean well as an aerosol mist.

What is also presented is a process of treating a subterranean well comprising a plurality of flow channels and at least one of the flow channels has been impaired. The treatment is used for alleviating the impairment. The process comprises, a continuous flow of gaseous carrier fluid supplied into the subterranean well. Once in the subterranean well, the gaseous carrier fluid substantially pushes liquids out of the plurality of the flow channels. At some point, a liquid treatment agent is created. To create the liquid treatment agent, first, a compounded combination of surfactant solution and sorbitan fatty acid ester is created and then diluted with a solvent. The surfactant solution is created by compounding a plurality of non-ionic ethoxylated sorbitan fatty acid ester surfactants together. A sorbitan fatty acid ester can then be compounded with the surfactant solution until a proper hydrophilic-lipophilic balance is achieved. A volume of the liquid treatment agent is placed into a treatment supply tank. The liquid treatment agent is then provided from the treatment supply tank to an atomizing apparatus. The liquid treatment agent is atomized. This atomized liquid treatment agent is blended with the gaseous carrier fluid, to create an atomized treatment fog. The atomized treatment fog is supplied into the subterranean well as an aerosol mist. The atomized treatment fog is then pressurized while in the subterranean well. The pressurized atomized treatment fog remains in the subterranean well for a duration of time. After the duration of time has ended, the subterranean well is depressurized and the atomized treatment fog can escape.

A portion of the liquids can be removed from the bottom of the subterranean well before supplying the continuous flow of gaseous carrier fluid into the subterranean well. The duration of time can be between three and seven days, but it does not have to be. The liquid treatment agent can be enhanced by adding inorganic acids, organic acids, clay stabilizers, bactericides, scale inhibitors, dissolved salts, emulsion breakers, water block breakers, or corrosion inhibitors. The subterranean well process can be implemented through a gaseous carrier fluid atomizing system. The surfactant solution can be diluted with the solvent in a ratio of 1 part surfactant solution to 20 parts solvent. The solvent can be one of water, toluene, condensate, acetone, oils, mutual solvents, or a combination thereof. The gaseous carrier fluid can be air, natural gas, oxygen, propane, nitrogen, helium, carbon dioxide, or a combination thereof. The solution ratio of the atomized treatment fog can be between 100 and 400. The atomized treatment fog can have the ability to energize and reduce the viscosity of the valuable liquids in the subterranean well.

What is also presented is a process of treating contaminated portions of the earth with a surfactant solution. This process comprises creating surfactant solution by compounding a non-ionic ethoxylated sorbitan fatty acid ester surfactant with another surfactant until a proper hydrophilic-lipophilic balance is achieved. The surfactant solution is pressured into the contaminated portions of the earth. The surfactant solution energizes and reduces the viscosity of the contaminants in the contaminated portions of the earth. The contaminants treated with the surfactant solution are removed from the portions of the earth.

Those skilled in the art will realize that this invention is capable of embodiments that are different from those shown and that details of the devices and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

The FIGURE shows a side view of a subterranean well in its environment and a gaseous carrier fluid treatment apparatus used in conjunction therewith, the drawing being partially in schematic representation form.

DETAILED DESCRIPTION

Referring to the drawings, some of the reference numerals are used to designate the same or corresponding parts through the FIGURE as shown and described.

Deep below the earth's surface, petroleum bearing formations contain liquids (valuable liquids such as, but not limited to, crude oil and other non-valuable liquids such as, but not limited to, brine water). Subterranean wells are drilled deep enough through the earth surface to reach the petroleum bearing formation. A plurality of natural or man-made interstitial flow channels (which are made possible by a "fracture network" in the petroleum bearing formation surrounding the subterranean well) exist or are created deep in the subterranean well. These flow channels are openings in the walls of the subterranean well that enable valuable liquids to flow into the subterranean well through the effects of gravity and/or pressure from the petroleum bearing formation. After flowing into the subterranean well, the valuable liquids are extracted through the implementation of a pump jack.

Usually the petroleum bearing formation that surrounds the subterranean well is situated around 750 feet in depth below the earth and is approximately 20 feet in size from top to bottom. A plurality of subterranean wells can be drilled to access the valuable liquids in a single petroleum bearing formation. However, since each subterranean well is positioned at a different location, the petroleum bearing formation surrounding a specific subterranean well can be situated at a different depth, can be a different size, and have different specific characteristics.

As production time passes, the flow channels tend to become clogged and impaired by particles and/or swelled clays, which include, but are not limited to, scales, paraffins, asphaltenes, precipitating minerals, organic deposition, water block, emulsion block, and or the swelling of clays. These particles and/or swelled clays tend to allow more non-valuable liquids that are less viscous than the valuable liquids to flow through the flow channels. In turn, the proportion of non-valuable liquids begin to outweigh the amount of valuable liquids being produced from the subterranean well. After a long-enough duration, the proportion of non-valuable liquids over valuable liquids is so great that the subterranean well becomes uneconomical.

It is at this point that the subterranean well treatment process is implemented to alleviate impairment by particles and/or swelled clays, making the subterranean well economical again. As shown in the FIGURE, subterranean wells 14 are drilled through the earth 40 and into petroleum bearing formations 36 with the expectation that valuable liquids will flow into the subterranean well 14 for extraction. The subterranean well 14 is typically installed with a well casing 24 which provides structural integrity and allows the subterranean well 14 to be sealed. A well pump 12, which is typically a submersible pump of some kind, is installed at the bottom of the subterranean well 14. A pump jack 10 acts on the well pump 12 to remove valuable liquids and invaluable liquids through extraction piping 42 to production fluid tanks 44 on the surface.

A gaseous carrier fluid atomizing system 16 is installed on the subterranean well 14. The gaseous carrier fluid atomizing system 16 comprises an aerating pipe 20 that is connected to an atomizing apparatus 22. The atomizing apparatus 22 is in turn connected to a compressor 30 and a liquid pump 32. The liquid pump 32 is connected to a treatment supply tank 34, which contains a quantity of liquid treatment agent (discussed below). In this embodiment, the liquid pump 32 is a high-pressure pump. The gaseous carrier fluid atomizing system 16 is connected to the subterranean well 14 by connecting the distal end of an aerating pipe 20 to the head of the casing 28 of the subterranean well 14. A valve 26 is mounted on the aerating pipe 20.

In order to begin the treatment process, the pump jack 10 begins acting on the well pump 12 and substantially removes as much of the liquids from the bottom of the subterranean well 14 as possible. The compressor 30 then supplies pressurized gaseous carrier fluid through the aerating pipe 20 and down into the subterranean well 14. Once in the subterranean well 14, the gaseous carrier fluid pushes out any remaining liquids and enters into the flow channels 18.

To push out the remaining liquids, the compressor 30 creates a continuous and consistent flow of the gaseous carrier fluid into the subterranean well 14 with enough force to cause the liquids to retreat back through the flow channels 18 and into the petroleum bearing formation 36. The volume and pressure of the gaseous carrier fluid depends on both the specific characteristics of the petroleum bearing formation 36 surrounding the subterranean well 14 and the characteristics of the flow channels 18. Typically, a minimum of 10,000 cubic feet of gaseous carrier fluid is used in this process. Since gases can more quickly and easily enter areas that liquids cannot, it should be understood that implementing a gaseous carrier fluid is much more efficient than implementing carrier fluid in a liquid state. For economical purposes, the gaseous carrier fluid is either air or natural gas. However, other active gasses, such as oxygen or propane, or inactive gasses such as nitrogen, helium, or carbon dioxide, or a combination thereof can be used.

Once a continuous flow of gaseous carrier fluid has been established within the flow channels 18, the liquid pump 32 is operated and begins forcing the liquid treatment agent from the treatment supply tank 34 into the atomizing apparatus 22. The atomized liquid treatment agent then enters the aerating pipe 20 and blends with the gaseous carrier fluid to create an atomized treatment fog 38 that is misted as an aerosol into the subterranean well 14. Once misted as an aerosol, the atomized treatment fog 38 has a low enough viscosity to enable it to enter the petroleum bearing formation 36 and disperse through the smallest of the flow channels 18. The low viscosity of the atomized treatment fog 38 also allows it to coat all surfaces deep down in the subterranean well 14. In this embodiment, the blending of the liquid treatment agent with the gaseous carrier fluid is conducted through the atomizing apparatus 22. However, other apparatuses may be used to atomize the liquid treatment agent with the gaseous carrier fluid, so long as these apparatuses are properly suited to produce adequate atomized treatment fog 38.

The atomizing apparatus 22 has an internal nozzle (not shown) that finely atomizes the liquid treatment agent when high pressure is used to spray the liquid treatment agent out of the internal nozzle. The internal nozzle properly and evenly mists the liquid treatment agent with the gaseous carrier fluid that is flowing through the atomizing apparatus 22. After being misted, the flow of the gaseous carrier fluid causes the liquid treatment agent to be suspended and carried as the atomized treatment fog 38. If there was no flow of the gaseous carrier fluid or if the flow is improperly weak, the molecular attraction of certain molecules in the atomized liquid treatment agent would cause the molecules to come back together and the liquid treatment agent to stop being atomized.

The liquid treatment agent is chemically compounded to produce minimal amounts of foam when atomized. In turn, the atomized treatment fog 38 can be properly misted as an aerosol into the subterranean well 14 without foaming. This enables the atomized treatment fog 38 to have maximum penetration when entering the flow channels 18 and enabling full effectiveness of the treatment process. In this embodiment, the liquid pump 32 should begin its operations once the continuous and consistent flow of gaseous carrier fluid has been established into the flow channels 18.

It should be noted that in the past, other processes would incorporate various treatment agents comprising surfactants that foamed immediately after being misted as an aerosol. After foaming, the treatment agents then made contact with the flow channels 18. Foaming surfactants tend to create air bubbles within the flow channels 18 that block the subsequent flow of other fluids or treatment agent into the flow channels 14. In turn, this foaming effect reduces the ability of the treatment agent to enter into the flow channels 14 and be fully effective.

A multi-step process is used in creating the liquid treatment agent. In the first step, a surfactant solution is created by compounding a plurality of surfactants together. Through empirical testing, it has been found that the surfactant solution must comprise at least two non-ionic ethoxylated sorbitan fatty acid esters. In some instances, additional effectiveness has been found when a sorbitan fatty acid ester is compounded in with this plurality of non-ionic ethoxylated sorbitan fatty acid esters. These surfactants must be compounded together until a proper hydrophilic-lipophilic balance (HLB) is achieved that matches the specific characteristics of the petroleum bearing formation 36 surrounding the subterranean well 14. A surfactant solution having an HLB between 2 and 16 can be chosen to treat a subterranean well 14. In environments comprising shallow sands around the subterranean well 14, typically, a surfactant solution having an HLB of approximately 11.625 will suffice. It should be understood, HLB is considered the measure of the degree to which the surfactant is hydrophilic or lipophilic. It should also be understood prior processes do not blend surfactants in their treatment agents to match the specific HLB of the petroleum bearing formation 36 surrounding the subterranean well 14 to be treated.

In the second step, the surfactant solution is diluted with a solvent to create the liquid treatment agent. Usually the surfactant solution is diluted in the ratio of 1 part surfactant solution to 20 parts solvent (e.g. adding 5 gallons of the surfactant solution to 95 gallons of solvent). The solvent can be, but is not limited to, water, toluene, condensate, acetone, oils, mutual solvents, or a combination of any of these. It should be understood that inorganic acids, organic acids, clay stabilizers, dissolved salts, bactericides (including ionized metals), scale inhibitors, emulsion breakers, water block breakers, or corrosion inhibitors can further enhance the liquid treatment agent solution. It has been found that a minimum of 10 gallons of liquid treatment agent should be used in the process.

Through empirical testing it has been found that non-ionic ethoxylated sorbitan fatty acid esters have the unique ability to trap and hold the atomized treatment fog 38 in the valuable liquids. These non-ionic ethoxylated sorbitan fatty acid esters also seem to energize the valuable liquids while reducing their viscosity. This effect in turn allows the valuable liquids to flow from the flow channels with less resistance from entering the subterranean well 14. Non-ionic ethoxylated sorbitan fatty acid esters used in the surfactant solution are sometimes sold under the trademark TWEEN. Empirical testing has shown that surfactant solutions comprising TWEEN 65, TWEEN 80, and/or TWEEN 85 are particularly effective in trapping and holding the atomized treatment fog 38 in the valuable liquids. Sorbitan fatty acid esters that are used in the surfactant solution are sometimes sold under the trademark SPAN.

As mentioned above, the atomized liquid treatment agent and gaseous carrier fluid are misted together to create the atomized treatment fog 38. The relationship between the volume of gaseous carrier fluid and atomized liquid treatment agent is defined as the solution ratio. Through empirical testing it has been found solution ratios of 100 to 400 are very effective on an average sized subterranean well 14. In shallow subterranean wells 14, solution ratios of 160, comprising 16,000 cubic feet of gaseous carrier fluid with 100 gallons of liquid treatment agent, have been found to be very effective. However, it has been found that any solution ratio between 40 and 1,000 can be used in this process. For example, an embodiment of the process could use somewhere between 40 and 1,000 cubic feet of gaseous carrier fluid for every gallon of liquid treatment agent. Using approximately 16,000 cubic feet of gaseous carrier fluid has been found to be very economical when compared to past processes for treating subterranean wells. It should be noted that the solution ratio can remain constant while the quantities of gaseous carrier fluid and liquid treatment agent increase or decrease in proportion to the characteristics of the petroleum bearing formation 36.

The chemical composition of the variety of components in the atomized treatment fog 38 enables the atomized treatment fog 38 to dissolve and shrink the clogging particles and/or swelled clays in the flow channels 18. The volume of atomized treatment fog 38 sprayed into the subterranean well 14 is based upon both the characteristics of the plurality of flow channels 18 and the subterranean well 14. The chemical reaction time necessary for the atomized treatment fog 38 to clear out the flow channels 18 is dependent upon the formation conditions in the subterranean well 14, including temperature, pressure, and number of flow channels 18.

In many instances, after the atomized treatment fog 38 is introduced into the subterranean well 14, the valve 26 is closed for a duration of time. This pressurizes the subterranean well 14 and ensures that the liquid treatment agent has adequate time to chemically react with particles and/or swelled clays that impede the flow channels 18. The duration of time should be at least one day but is typically between three and seven days. After enough time has lapsed, the valve 26 is opened to atmosphere (or tied into a gas gathering line) and the subterranean well 14 is brought back into production. Pressurizing the subterranean well 14 with the atomized treatment fog 38 has been found to be effective in subterranean wells 14 having low temperatures and petroleum bearing formations 36 with low pressures. In certain instances, the implementation of this treatment can increase the production rate of the subterranean well 14 by at least ten times the production rate before treatment. It should be understood that this process applies to any type of subterranean well, which include, but are not limited to, withdrawal wells, gas wells, and injection wells.

It has also been found that surfactant solutions comprising non-ionic ethoxylated sorbitan fatty acid esters also assist in decontaminating portions of the earth 40 that are contaminated with contaminating compounds. In such instances the surfactant solution is blended to an HLB that matches the contaminated portion of the earth 40. Then, in combination with the gaseous carrier fluid, the surfactant solution is pressured directly into the contaminated portions of the earth 40, where the surfactant solution energizes and lowers the viscosity of dissolved contaminating compounds. In effect, the treated contaminating compounds then become generally less resistant, making for easier removal from the earth. The contaminating compounds are then removed from the earth. In some instances the surfactant solution could be enhanced by having it diluted with solvents prior to being pressured directly into the contaminated portions of the earth 40. In other instances the surfactant solution can be used in conjunction with air when being pressured directly into the contaminated portions of the earth 40. It should be understood this contamination removal process can also be conducted in subterranean wells 14. Contaminating compounds include, but are not limited to, toxic chemicals, solvents, hydrocarbon solvents, and contaminants, etc.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

The invention claimed is:

1. A subterranean well treatment system for a subterranean well, the subterranean well comprising a plurality of flow channels within a petroleum bearing formation, the petroleum bearing formation having specific characteristics, wherein at least one of the flow channels is impaired, and wherein said system treats the subterranean well by alleviating the impairment, said system comprising:
    a liquid treatment agent comprising a solvent and a surfactant solution that comprises a plurality of different non-ionic ethoxylated sorbitan fatty acid ester surfactants compounded together that achieve a hydrophilic-lipophilic balance which matches the specific characteristics of the petroleum bearing formation;
    a source of a carrier gas to supply a continuous flow of said carrier gas into the subterranean well to push any liquids out of the plurality of flow channels; and
    an atomizer that atomizes said liquid treatment agent into said carrier gas to create an atomized non-foaming treatment fog comprising said atomized liquid treatment agent blended with said carrier gas in a concentration sufficient to suspend said atomized liquid treatment agent as a fog within said carrier gas.

2. The subterranean well treatment system of claim 1 further comprising a non-foaming mixture comprising said atomized non-foaming treatment fog with clogging particles, swelled clay, or both, said non-foaming mixture treating each flow channel without bubbles.

3. The subterranean well treatment system of claim 1 wherein the quantity of the liquids at the bottom of the subterranean well is smaller due a portion of the liquids being removed before a continuous flow of carrier gas is supplied into the subterranean well.

4. The subterranean well treatment system of claim 1 further comprising:
    pressurized atomized non-foaming treatment fog remaining within the subterranean well for a duration of time; and
    depressurized conditions within the subterranean well such that said atomized non-foaming treatment fog escapes.

5. The subterranean well treatment system of claim 1 further comprising:
    pressurized atomized non-foaming treatment fog remaining within the subterranean well for between three and seven days; and
    allowing the subterranean well to depressurize such that said atomized non-foaming treatment fog can escape.

6. The subterranean well treatment system of claim 1 further comprising:
    a treatment supply tank containing a volume of said liquid treatment; and
    a connection from said treatment supply tank to an atomizing apparatus to provide said liquid treatment agent to said atomizing apparatus.

7. The subterranean well treatment system of claim 1 further comprising:
    a treatment supply tank containing a volume of said liquid treatment agent;
    an atomizing apparatus which receives said liquid treatment agent from said treatment supply tank;
    atomized liquid treatment agent received from said atomizing apparatus; and
    a blend of said atomized liquid treatment agent with said carrier gas sent through said atomizing apparatus.

8. The subterranean well treatment system of claim 1 further comprising a sorbitan fatty acid ester, compounded with said surfactant solution until a hydrophilic-lipophilic balance, that matches the specific characteristics of the petroleum bearing formation surrounding the subterranean well.

9. The subterranean well treatment system of claim 1 wherein said liquid treatment agent further comprises inorganic acids, organic acids, clay stabilizers, bactericides, scale inhibitors, dissolved salts, emulsion breakers, water block breakers, or corrosion inhibitors.

10. The subterranean well treatment system of claim 1 further comprising a carrier gas atomizing system.

11. The subterranean well treatment system of claim 1 wherein said surfactant solution is diluted with said solvent in a ratio of 1 part surfactant solution to 20 parts solvent.

12. The subterranean well treatment system of claim 1 wherein said solvent is one of water, toluene, condensate, acetone, oils, mutual solvents, or a combination thereof.

13. The subterranean well treatment system of claim 1 wherein said carrier gas is air, natural gas, oxygen, propane, nitrogen, helium, carbon dioxide, or a combination thereof.

14. The subterranean well treatment system of claim 1 wherein said atomized non-foaming treatment fog comprises a solution ratio of between 100 and 400.

15. The subterranean well treatment system of claim 1 wherein the viscosity of valuable liquids in the subterranean well is energized and reduced by said atomized non-foaming treatment fog.

16. The subterranean well treatment system of claim 1 wherein said atomized non-foaming treatment fog supplied into the subterranean well is an aerosol mist.

17. The subterranean well treatment system of claim 1 wherein the specific characteristics identified comprise the hydrophilic-lipophilic balance of the petroleum bearing formation surrounding the subterranean well.

18. A subterranean well treatment system for a subterranean well, the subterranean well comprising a plurality of flow channels within a petroleum bearing formation, the petroleum bearing formation having specific characteristics, wherein at least one of the flow channels is impaired, and wherein said system treats the subterranean well by alleviating the impairment, said system comprising:
  a liquid treatment agent comprising a solvent and a surfactant solution that comprises a plurality of different non-ionic ethoxylated sorbitan fatty acid ester surfactants compounded together that achieve a hydrophilic-lipophilic balance which matches the specific characteristics of the petroleum bearing formation;
  a source of a carrier gas to supply a continuous flow of said carrier gas into the subterranean well to push any liquids out of the plurality of flow channels;
  an atomizer that atomizes said liquid treatment agent into said carrier gas to create an atomized non-foaming treatment fog comprising said atomized liquid treatment agent blended with said carrier gas in a concentration sufficient to suspend said atomized liquid treatment agent as a fog within said carrier gas;
  a treatment supply tank containing a volume of said liquid treatment agent;
  a connection from said treatment supply tank to said atomizer to provide said liquid treatment agent to said atomizing apparatus; and
  a non-foaming mixture comprising said atomized non-foaming treatment fog with clogging particles, swelled clay, or both, said non-foaming mixture treating each flow channel without bubbles.

19. The subterranean well treatment system of claim 18 wherein the quantity of the liquids at the bottom of the subterranean well is smaller due a portion of the liquids being removed before a continuous flow of carrier gas is supplied into the subterranean well.

20. The subterranean well treatment system of claim 18 further comprising a solution of a sorbitan fatty acid ester compounded with said surfactant solution until a hydrophilic-lipophilic balance is achieved that matches the specific characteristics of the petroleum bearing formation surrounding the subterranean well.

21. The subterranean well treatment system of claim 18 wherein said liquid treatment agent further comprises inorganic acids, organic acids, clay stabilizers, bactericides, scale inhibitors, dissolved salts, emulsion breakers, water block breakers, or corrosion inhibitors.

22. The subterranean well treatment system of claim 18 wherein the process is implemented through a carrier gas atomizing system.

23. The subterranean well treatment system of claim 18 wherein said surfactant solution is diluted with said solvent in a ratio of 1 part surfactant solution to 20 parts solvent.

24. The subterranean well treatment system of claim 18 wherein said solvent comprises one of water, toluene, condensate, acetone, oils, mutual solvents, or a combination thereof.

25. The subterranean well treatment system of claim 18 wherein said carrier gas comprises air, natural gas, oxygen, propane, nitrogen, helium, carbon dioxide, or a combination thereof.

26. The subterranean well treatment system of claim 18 atomized non-foaming treatment fog comprises a solution ratio of between 100 and 400.

27. The subterranean well treatment system of claim 18 wherein said atomized non-foaming treatment fog energizes and reduces the viscosity of any valuable liquids in the subterranean well.

28. The subterranean well treatment system of claim 18 wherein the specific characteristics identified comprise the hydrophilic-lipophilic balance of the petroleum bearing formation surrounding the subterranean well.

29. A subterranean well treatment system for a subterranean well, the subterranean well comprising a plurality of flow channels within a petroleum bearing formation, the petroleum bearing formation having specific characteristics, wherein at least one of the flow channels is impaired, and wherein said system treats the subterranean well by alleviating the impairment, said system comprising:
  means for creating a liquid treatment agent by:
    means for compounding a plurality of different non-ionic ethoxylated sorbitan fatty acid ester surfactants together until a hydrophilic-lipophilic balance is achieved that matches the specific characteristics of the petroleum bearing formation surrounding the subterranean well, to create a surfactant solution; and
    means for subsequently diluting the surfactant solution with a solvent;
  means for supplying a continuous flow of carrier gas into the subterranean well;
  means for allowing the carrier gas to push any liquids out of the plurality of flow channels;
  means for atomizing the liquid treatment agent; and
  means for blending the atomized liquid treatment agent with the carrier gas in a concentration sufficient to suspend the atomized liquid treatment agent as a fog within the carrier gas, and outputting an atomized non-foaming treatment fog.

30. The subterranean well treatment system of claim 29 further comprising means for supplying the atomized non-foaming treatment fog, comprising the atomized liquid treatment agent suspended as a fog within the carrier gas, into the subterranean well wherein the atomized non-foaming treatment fog treats each flow channel without generating bubbles.

* * * * *